United States Patent [19]

Ashmead et al.

[11] 3,799,396
[45] Mar. 26, 1974

[54] METHOD FOR PRODUCING A GRADIENT ELUTION

[75] Inventors: Howard L. Ashmead; Sydnor H. Byrne, Jr., both of Newark; John P. Wolf, III, Wilmington, all of Del.

[73] Assignee: E. I. Du Pont de Nemours and Company, Wilmington, Del.

[22] Filed: June 26, 1972

[21] Appl. No.: 265,995

Related U.S. Application Data

[62] Division of Ser. No. 36,633, May 12, 1970, Pat. No. 3,712,513.

[52] U.S. Cl............... 222/1, 137/101.11, 137/607, 137/624.18, 222/134
[51] Int. Cl........................................... B01d 15/08
[58] Field of Search......... 137/101.11, 607, 624.11, 137/624.18; 222/70, 134, 1, 145

[56] References Cited

UNITED STATES PATENTS 2,770,248 11/1956 Audia ........................... 137/624.18
3,251,508 5/1966 Borys................................... 222/145
3,381,699 5/1968 Coffman.............................. 222/70

Primary Examiner—Robert B. Reeves
Assistant Examiner—Thomas E. Kocovsky

[57] ABSTRACT

The method of proportioning two liquids comprising periodically controlling the operation of a valving means to control the amount of each liquid supplied to a mixing region during each period of valve operation to produce a supply of eluent having a precisely controlled time varying concentration of each liquid.

3 Claims, 7 Drawing Figures

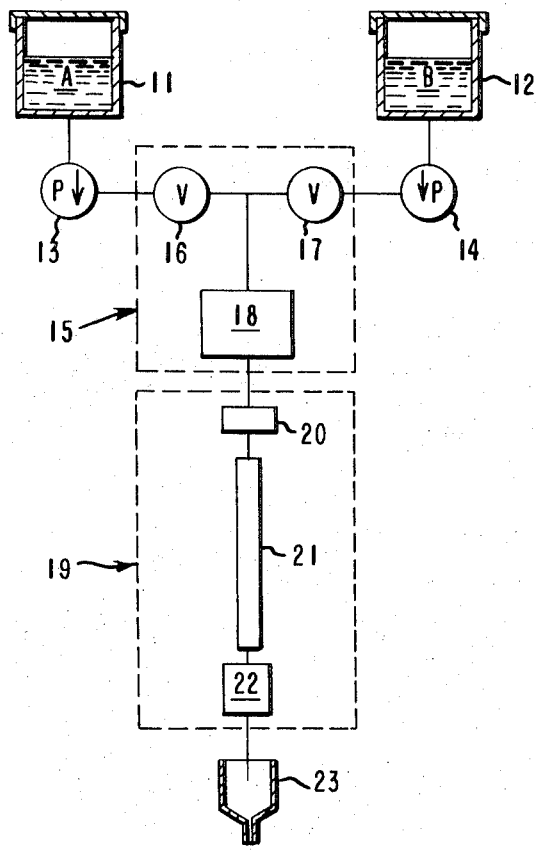
FIG. 1
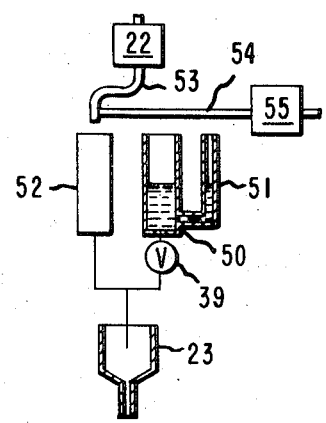
FIG. 5
FIG. 7
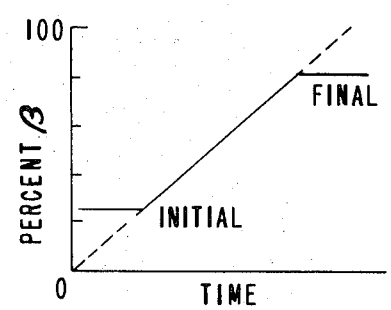
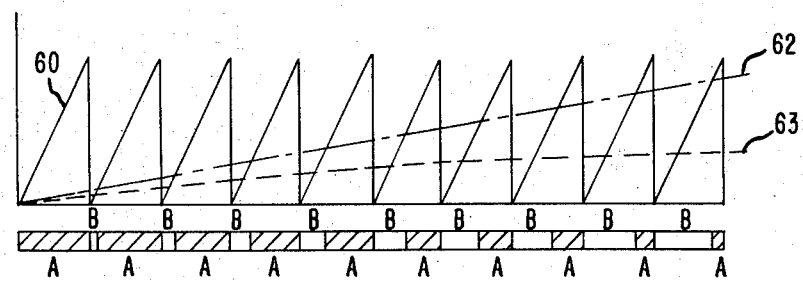
FIG. 6

METHOD FOR PRODUCING A GRADIENT ELUTION

This is a division, of application Ser. No. 36,633, filed May 12, 1970 now U.S. Pat. No. 3,712,513.

BACKGROUND OF THE INVENTION

This invention relates to the field of elution. More specifically it relates to a method and system for producing an eluent having a known concentration of different liquids. More specifically still, it relates to a method and system for producing an eluent having a time varying concnetration of different liquids.

The simplest elution system, used for example in a chromatographic column, supplies an eluent comprising a single liquid to the column. In many instances, however, this single liquid is not effective in removing all of the desired material from the column, and a second liquid must subsequently be supplied. Alternately, an eluent having a set concentration of the two liquids is used. More than two liquids can and have been used, but for convenience in describing the prior art and our invention, we will limit the discussion that follows to a system using two liquids which we will label liquid A and liquid B. Switching liquids in mid-operation and the use of a mixture of liquids have not been favored procedurally, and there has been a recent tendency to gradient elution systems. In gradient elution, the initial eluent contains a set concentration of the liquids (usually 100 percent of A and none of B), and this concentration is slowly altered, through intermediate concentrations, to a second set concentration of the liquids (usually none of A and 100 percent of B). The conventional way of doing this is to use two constant flow pumps. One of these pumps pumps liquid from a pot containing liquid having the initial concentration of the two liquids (usually 100 percent of A and none of B) to the column. The second pump pumps liquid having the desired final concentration of the two liquids (usually none of A and 100 percent of B) into the pot provided for the first pump so that the concentration of liquid in the pot which is being pumped to the column, gradually changed to the final concentration. This procedure has several disadvantages. Two pumps are necessary, and although the change in concentration can be fairly precisely controlled, the system is not versatile in terms of the ability to tailor changes in concentration, to meet the needs of individual tests. In some instances, instead of using the two stage system described above, two proportional flow valves are used in combination with the two pumps, and the flow of liquid through the valves is varied to achieve the desired concentration. This system suffers from the fact that the flow through proportional valves is difficult if not impossible to control with any precision, especially at low flow, so that the concentration cannot be controlled precisely.

It is an object of the present invention to provide a method and system for providing an eluent in which the concentrations of the liquid parts is precisely known. It is a further object of the present invention to provide an eluent having precisely controlled time varying concentrations of the liquid parts. It is a still further object of the present invention to provide a system for producing an eluent having time varying concentrations of liquid parts in which the means for controlling the concentration of liquids provides for flexible control over the concentrations of the liquids in the eluent and over the rate of change of those concentrations. It is another object of the present invention to provide a method and system for producing an eluent having a time varying concentration of liquids, in which a single pump is used.

SUMMARY OF THE DISCLOSURE

These objects are accomplished by providing: separate sources of liquids, in the case being discussed, a source of first liquid and a source of second liquid; a proportioning means comprising a mixing region, valving means connected to the mixing region and programming means connected to and adapted to activate the valving means; and separate liquid supply means, in this case a first liquid supply means and a second liquid supply means to supply the first and second liquids respectively to the valving means. The mixing region is then connected directly to the column. The valving means comprises at least two operative portions, a first operative portion connected between the first liquid supply means and the mixing region and a second operative portion connected between at least a portion of the second liquid supply means and the mixing region. The programming means periodically activates one or the other of the operative portions of the valving means to allow the mixing region to be periodically supplied with each liquid.

The mixing region can be any region adapted to produce the required amount of mixing between the two fluids. In one embodiment the mixing region can be a separate mixing chamber with a volume substantially larger than the maximum volume of liquid entering the mixing region during the period when either operative portion of the valving means is activated, and the chamber can be provided with some means to thoroughly mix the liquids in the chamber so that the mixture is homogeneous throughout the chamber. In a simpler but still effective embodiment, the mixing region is provided by the connecting lines between the valving means and the column alone. Depending upon how homogeneous the mixture must be for the particular purpose involved, the volume of the mixing region can be less than, equal to or greater than the maximum volume entering the mixing region during the period when either operative portion of the valving means is operative. While it might be expected that either a very large mixing region or some additional mixing device, such as frittered plug to provide highly turbulent regions would have to be provided, we have found that except in those applications where a high degree of uniformity is required, a reasonably small volume of connecting tubing alone will provide substantial mixing. As an example, when each operative portion of the valving means passes 0.25 cc. of liquid, a mixing region having a volume of 0.50 cc. will produce a final mixture at the end of the mixing region having a periodic variation of no more than 1.0 percent. If a variation of 10 to 20 percent were tolerable, the volume of the mixing region could even be less than the volume of liquid periodically passed through the valving means. It appears that in this dynamic system; substantial mixing is produced by diffusion, friction, eddy currents and the like.

The mixing region is also provided with a means to allow a portion of any liquid contained in the mixing region to be removed from the mixing region, thereby supplying an eluent having a concentration of each liquid equivalent to the instantaneous concentration of each liquid in the mixing region at the time the liquid is removed from the mixing region. Preferably the liquid is removed from the mixing region and supplied to the column continously.

The valving means can be: a three-way valve in which case one of the paths therein is the first operative position and the other path is the second operative position; a pair of separate valves, in which each valve is a separate operative portion of the valving means, or any suitable on-off valving means which will allow liquid to be switched from one fluid line to another fluid line. For convenience in the discussion that follows, we will limit our discussion to a system in which two separate valves are used. These valves can be any valve, such as a solenoid valve or an air actuated valve which can be activated by an externally generated signal. The programming means is, then, any means that will generate and supply a signal to the valves which will activate the valves. In the preferred embodiment the valves are solenoid valves; and the programming means is an electronic signal generator adapted to produce two electronic signals, one being a periodic signal and the other being a monotonically increasing function. The programming means is further adapted to control the valves by opening one when the instantaneous value of one signal exceeds the instantaneous value of the other signal, and then opening the other when the reverse situation occurs.

The first and second liquid supply means can be two separate pumps, either constant flow or constant pressure pumps as the situation demands; but in the preferred embodiment, a single pump is used. Instead of the second pump, a holding chamber is provided. The single pump alone is used as the first liquid supply means to supply the first liquid to the first valve. The second liquid supply means comprises both the holding chamber, which is adapted to be filled with the second liquid, and the pump. The pump is connected to the holding chamber and the second valve in a manner such that when the second valve is open, the first liquid supplied by the pump is used to force the second liquid contained in the holding chamber to the second valve. The valve can be located on either the upsteam or downstream side of the holding chamber, and either a constant flow or constant pressure pump can be used depending on the particular needs of the system. The holding chamber must be constructed so that substantial mixing of the first liquid with the second liquid does not occur in the true interval while the system is in operation. A holding chamber in the form of a long thin tube which hold substantially more liquid than is to be used in a particular situation fills this criteria.

The detailed operation of the system described above can best be described by reference to the following figures:

FIG. 1 is a schematic diagram of the simplest embodiment of the present invention;

FIG. 5 is a schematic diagram of one embodiment of a device used to measure the amount of liquid removed from the holding chamber;

FIG. 6 is a diagram of several of the possible wave functions that can be used to control the valves, and the programming sequence they produce; and FIG. 7 is a graph of one possible programming sequence.

DETAILED DESCRIPTION OF THE DRAWINGS

Figure 2:
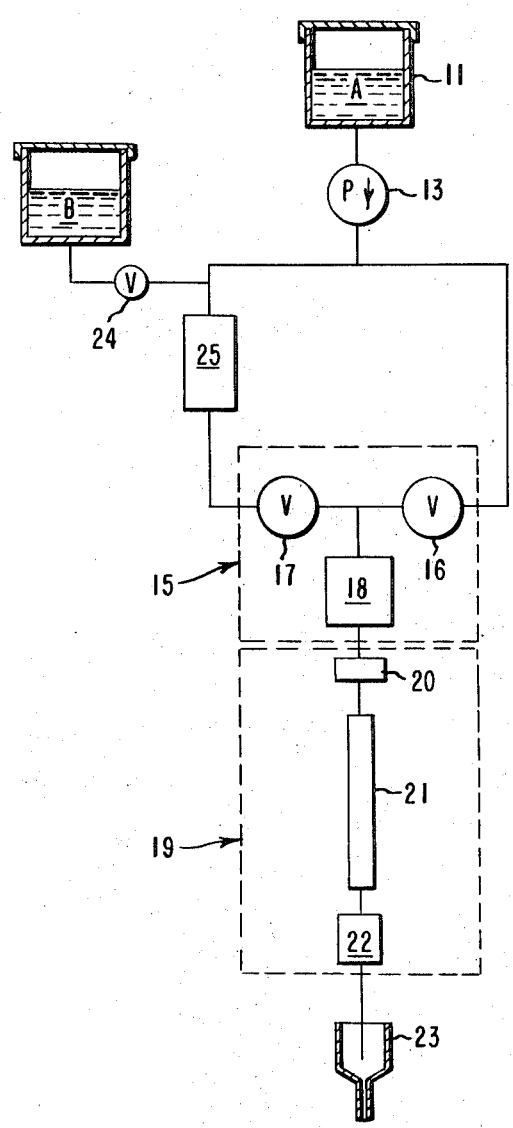
FIG. 2 is a schematic diagram of a first embodiment of an improved version of the present invention which requires the use of only one pump.

Referring to FIG. 1, a source of liquid A, 11, and a source of liuqid B, 12, are provided and connected respectively to constant pressure pumps 13 and 14. These pumps are each connected to proportioning means 15 which comprises two on-off valves 16 and 17, a mixing region, and a programming means (not shown) which is connected to the valves and adapted to control the operation of the valves. For convenience, the mixing region is illustrated in this and the other figures as a separate mixing chamber 18 though, as discussed above, this is not necessary. Pumps 13 and 14 are connected respectively to valves 16 and 17 which are each connected to mixing chamber 18. The mixing chamber is in turn connected to a chromatographic column system 19 comprising an injection port 20, a column 21, and a detector 22. The column system in turn is connected to or empties into a drain 23. The elution system described herein is useful in any application where a well controlled or changing concentration of liquids in a mixture is required, but for convenience, we are discussing the system in its application to a system for supplying the eluent used in liquid chromatography. Being included for merely descriptive purposes, the details of the chromotographic system will not be described.

The on-off valves 16 and 17 are normally closed on-off valves of a type controlled by an external signal. Solenoid valves or air actuated valves are typical examples of such valves. Alternately, a signal actuated three-way valve could be used, or any valving means adapted to switch positively from one liquid to the other at controlled intervals. For convenience, we will limit the discussion that follows to solenoid valves and electronic programming means. It is to be understood, however, that any externally activated valve and a programming means adapted to activate it can be used instead.

In operation, the constant pressure pumps supply their liquids at constant pressure to each of the normally closed on-off valves respectively. The programming means then opens one of the valves for a set period of time. We will assume in what follows that liquid A is always the first fluid to flow and consequently, that valve 16 is the one opened, but the reverse can be true. A set volume of liquid A will enter the mixing chamber. Then the programming means will deactivate valve 16, and activate valve 17 for a second period of time to allow a set volume of fluid B to enter the mixing chamber. In the normal situation, the initial mixture of liquids in the mixing chamber would be 100 percent of liquid A and none of liquid B. To fill the chamber initially, then, valve 16 would open either periodically or for a long duration until the mixing chamber was filled with liquid A, and valve 17 would remain closed. The volume of the mixing chamber in this embodiment is larger than the volume of liquid each valve is programmed to allow to pass during each of its cycles when the valves are in periodic operation. During the filling step, instead of periodically opening and closing valve 16 to fill the mixing chamber 18, valve 16 can be kept open until the chamber is filled. In those situations where a high degree of uniformity is required, only a fraction of the volume of liquid needed to fill the mixing chamber is allowed to pass through the valve. The eluent supplied to a chromatographic column can be supplied at high pressure or just allowed to flow through the column under the force of gravity. We will limit our discussion to the former, more difficult situation, when the mixing chamber must be completely filled with the initial concentration. In this situation, a bleed-off valve on the mixing chamber may be useful to bleed off air trapped in the chamber or to assist in changing the fluids in the chamber. Assuming now that the mixing chamber is completely filled with liquid A, the programming means operates to change the concentration in the mixing chamber while the liquid in the chamber is being supplied under pressure, the pressure of pumps 13 and 14, to the column. The simplest situation would be where the final mixture is to contain 100 percent of liquid B and none of liquid A. One way to achieve this concentration would be to have the programming means activate valve 17 and not activate valve 16 at all. If substantial homogeneity of the mixture at the end of the mixing chamber next to the column is not achieved, then the precision and reproducibility of the concentration supplied to the column is poor and the resulting chromatographic determinations suffer.

In the operation just discussed, valve 17 is periodically or continuously opened introducing small volumes of liquid B into the liquid in the mixing chamber. Gradually the concentration of liquid B in the mixing chamber increases until the mixing chamber finally contains only liquid B. It is apparent that in some cases the supply of liquid A contained in the mixing chamber will not be sufficient to allow the change from the initial concentration to the final concentration takes place in a manner which will suit the needs of most eluting devices. In this case the programmming means will alternately activate valve 16 and valve 17 to maintain the pressure or just allowed to flow through the column under the force of gravity. We will limit our discussion to the former, more difficult situation, when the mixing chamber must be completely filled with the initial concentration. In this situation, a bleed-off valve on the mixing chamber may be useful to bleed off air trapped in the chamber or to assist in changing the fluids in the chamber. Assuming now that the mixing chamber is completely filled with liquid A, the programming means operates to change the concentration in the mixing chamber while the liquid in the chamber is being supplied under pressure, the pressure of pumps 13 and 14, to the column. The simplest situation would be where the final mixture is to contain 100 percent of liquid B and none of liquid A. One way to achieve this concentration would be to have the programming means activate valve 17 and not activate valve 16 at all. If substantial homogeneity of the mixture at the end of the mixing chamber next to the column is not achieved, then the precision and reproducibility of the concentration supplied to the column is poor and the resulting chromatographic determinations suffer.

In the operation just discussed, valve 17 is periodically or continuously opened introducing small volumes of liquid B into the liquid in the mixing chamber. Gradually the concentration of liquid B in the mixing chamber increases until the mixing chamber finally contains only liquid B. It is apparent that in some cases the supply of liquid A contained in the mixing chamber will not be sufficient to allow the change from the initial concentration to the final concentration takes place in a manner which will suit the needs of most eluting devices. In this case the programming means will alternately activate valve 16 and valve 17 to maintain the supply of liquid A in the mixing chamber. If valves 16 and 17 are alternately opened for the same set period of time, the final concentration will be 50 percent of liquid A and 50 percent of liquid B. To achieve a final concentration of 100 percent liquid B, the period during which valve 16 is open must be gradually decreased to zero. This is usually accompanied by an increase in the period during which valve 17 is open. The relative periods involved can be determined by the needs of the system. In fact the periods need not vary. If a set concentration is desired, each valve can be programmed to open for a different set period of time which will fix the desired concentration, and the concentration can be maintained by leaving the valve periods fixed during the entire operation.

FIG. 7 illustrates the versatility of such a device. In the situation where the experimentor does not know the most useful concentration of liquids. The initial concentration can be set at a reasonable level, and the results observed. If unsatisfactory, the concentration can be changed gradually until the desired or final concentration is achieved, at which point the concentration can be maintained at the desired level. If it is determined that gradient elution, a change from one concentration to another, is desirable, but the optimum rate of change is not known, the rate can be varied simply by programming the valves to open at a different frequency relative to one another, until the optimum rate of change is found.

FIG. 2 illustrates an improved version of the system shown in FIG. 1. The only change is that pump 14 has been replaced by a liquid supply means comprising a holding chamber 25 coupled between valve 17 and pump 13. The holding chamber is initially filled with liquid B from source 12 by opening valve 24 and allowing the chamber to fill by gravity or pressure. Valve 24 is then closed, and constant pressure pump 13 operates alternately to supply a portion of liquid A is directly to valve 16 and a portion of liquid A to the holding chamber 25 to force liquid B, contained in the holding chamber to valve 17. The advantage of this system is that a single pump can be used which means that the system is less expensive and also that both liquids are supplied to their respective valves at the same constant pressure or flow rate. When two pumps are used it is different to achieve this latter condition because it is difficult to match the pressures or flow rates developed by different pumps. The holding chamber must be constructed so that substantial mixing of liquid A and liquid B do not occur while liquid A is being used to force liquid B to valve 17. Also enough of liquid B must be contained in the holding chamber to complete the elution run. A long narrow holding chamber, such as a long thin tube fulfills these conditions.

Figure 3:
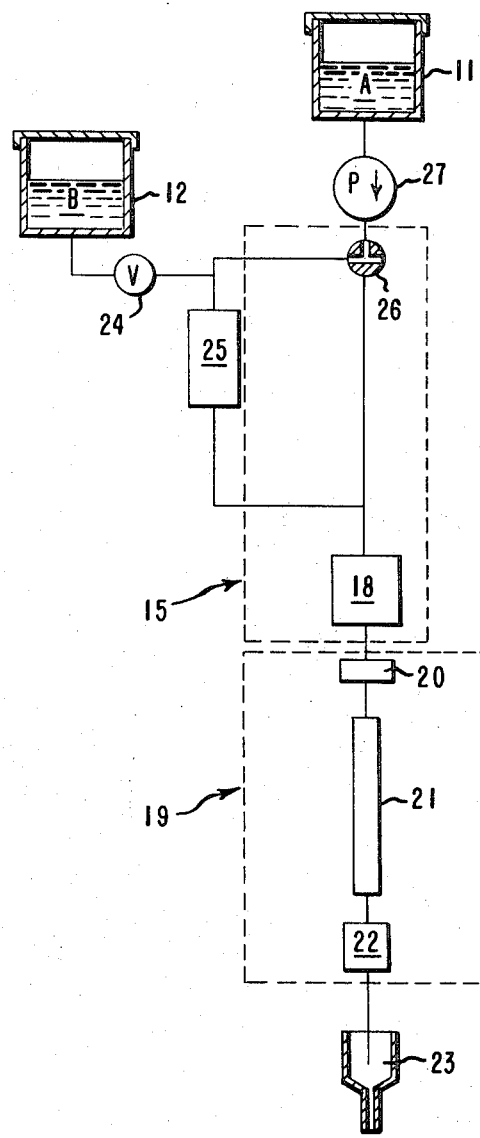
FIG. 3 is a schematic diagram of a second embodiment of the present invention which requires the use of only one pump.

FIG. 3 illustrates another embodiment of the same system. In this embodiment, the two valves 16 and 17 have been replaced by a single three-way valve 26, and constant pressure pump 13 has been replaced by constant flow pump 27. Valve 26 is located upstream of holding chamber 25 rather than on the downstream side but it could just have easily been located on the downstream side. Operation of the system is the same as that discussed with respect to FIG. 2.

Figure 4:
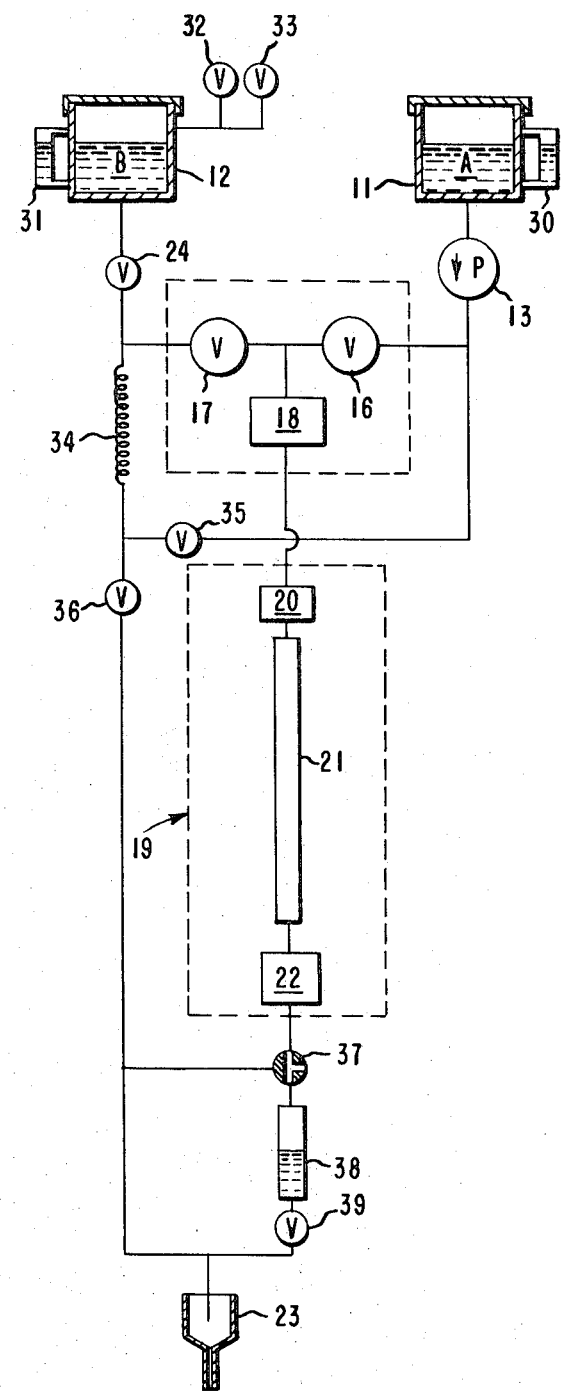
FIG. 4 is a schematic diagram of the preferred embodiment of the present invention.

FIG. 4 illustrates the preferred embodiment of the elution system. In this embodiment liquid sources 11 and 12 are provided with sight tubes 30 and 31, respectively, so that the level of liquid in each can be monitored. The holding chamber is in the form of a long thin coil of tubing 34, which is still filled by gravity or pressure through valve 24. Air or vacuum can be supplied to liquid source container 12 through valves 32 and 33 respectively to assist in filling holding chamber 34. The holding chamber is connected directly to drain 23 through valve 36 which is normally closed, and used to both drain the system and to aid in filling the holding chamber. The upstream side (low end) of the holding chamber is connected to pump 13 through valve 35 which is opened when the liquids are to be supplied to their respective valves. The operation of the system is similar to that discussed with reference to FIG. 2. The holding chamber is filled and valves 24 and 36 are closed. Valve 35 is open and pump 13 is used to both supply liquid A to valve 16 and to force the liquid contained in the holding chamber 34 to valve 17. The programmed mixture is forced through the column to a drain 23. Care must be taken in the operation of the system so that holding chamber 34 is not inadvertently emptied of liquid B during protracted operation so that only liquid A is being supplied to the mixing chamber. To prevent this, some means may be provided to keep track of the amount of liquid, originally contained in the holding chamber; that has been used. Control means 37 and trap 38 have been provided for this purpose. As illustrated control means 37 is a three-way valve. The three-way valve is adapted so that when valve 17 is open, the three-way valve is in the position illustrated and a volume of liquid equal to the volume of liquid that has passed through valve 17 is collected in trap 38; valve 39 being closed. When valve 17 is closed, the three-way valve rotates a quarter turn to the left and the liquid passes directly to the drain. The liquid level in trap 38 reflects the amount of liquid B removing in the holding chamber so that it can be replenished before it runs out. When the run is over, trap 38 is drained through valve 39.

It is conveninet to have control means 37 activated by the same signal that activates valve 17. FIG. 5 illustrates a simple way in which this can be done. Liquid leaving detector 22 is passed through a flexible tube 53 which is attached to rod 54, which in turn forms part of a solenoid system 55. Two traps are provided. One, 52, leads directly to drain 23; the other, 50, leads to the drain 23 through valve 39 which is usually closed. Trap 50 can be provided with a sight glass 51. When valve 17 is activated by an electrical signal, solenoid 55 is also activated, and flexible tube 53 is positioned over trap 50. When valve 17 is closed, solenoid 55 returns flexible tube 53 to its position over drain 23. This is a convenient way to collect an amount of liquid equal to the volume passing through valve 17, but any convenient way known to those skilled in the art can be used.

One advantage to all three of the systems described above is that when a high pressure elution system is being used, there is always the problem of high pressure liquid leaks. Leaks from the inside to the outside of the valves are not difficult to stop, but leaks through the valve are difficult to stop and require expensive valving. In the case of the constant pressure system described above, the pressure on both sides of valve 16 and 17 is substantially the same, so there is no pressure differential to cause a leak.

One of the greatest advantages of the present system is its versatility. The initial and final concentration of the eluent can be set with ease, and the rate of change of this concentration can also be set wtih ease. FIG. 6 illustrates a programming sequence that can be used to change the concentration in the eluent. This system uses two electronic signals; one signal, signal 60, is a periodic saw tooth wave, the other signal, signal 62, is a gating signal, which in the case illustrated is a linear ramp. The programming means, being an electronic signal generator, generates the two signals simultaneously, and is adapted to activate one valve, when the instantaneous value of the saw tooth wave is greater than the instantaneous value of the gating function, and to actuate the other valve when the instantaneous value of the saw tooth wave is less than the instantaneous value of the gating function. If valve 16 is the first valve, the shaded region of the bar below the graph indicates the time interval that liquid A is being supplied to the mixing chamber, and the unshaded regions indicate the time intervals where liquid B is being supplied. The relative periods will depend on the types of functions generated. Utilizing the versatility of electronic function generating, almost any programming sequence can be envisioned. The one illustrated is a useful programming sequence. A saw tooth wave 60 combined with any monotonically increasing gating signal of arbitrary function, such as signal 63 is another useful sequence. A linear gating signal 62, combined with any periodic signal of arbitrary function would also be useful.

The above discussion has been for the purpose of illustrating the usefulness and operation of our invention. It is claimed that more than two liquids can be handled in this manner, and that there are numerous modifications of the system disclosed that would occur to those skilled in the art. The above discussion is, therefore, not meant to limit the scope of our invention which is set forth in the following claims.

What is claimed is:

1. A method of producing an eluent containing a time varying concentration of two liquids, comprising the steps of:
   a. supplying a first liquid to a first operative portion of normally closed valving means;
   b. supplying a second liquid to a second operative portion of said normally closed valving means;
   c. alternately activating said first operative portion of said valving means for a first set period of time to allow a first set volume of said first liquid to enter a mixing region and then activating said second operative portion of said valving means for a second set period of time to allow a second set volume of said second liquid to enter said mixing region and mix with said first set volume of first liquid to form a mixture containing a set concentration of said first and second liquids;
   d. allowing a portion of said mixture to leave said mixing region thereby producing an eluent having a concentration of said first and second liquid, the instantaneous concentration of which is equal to the instantaneous concentration of said first and second liquids at the downstream end of said mixing region at the time said portion of said mixture leaves said mixing region; and e. varying said first and second set periods of time during which said first and second operative portions of said valving means are respectively activated, whereby the concentrations of said first and second liquids in said mixture are gradually changed so that an eluent having a time varying concentration of said first and second liquids is produced.

2. The method of claim 1 wherein the step of supplying a first liquid to the first operative portion of the valve means is accomplished by pumping a first quantity of the first liquid directly to the first operative portion of the valve means, and the step of supplying a second liquid to the second operative portion of the valving means is accomplished by transferring a quantity of the second liquid to a long narrow holding chamber and then pumping the second liquid contained in the holding tube to the second operative portion of the valving means by pumping a second quantity of the first liquid to the upstream side of the holding tube.

3. The method of claim 1 wherein the first and second liquids are supplied to the first and second operative portions of the valving means at a constant pressure.

* * * * *